United States Patent [19]

Guillen et al.

[11] Patent Number: 4,856,661

[45] Date of Patent: Aug. 15, 1989

[54] RETRACTABLE CLOTHES HANGER

[76] Inventors: Richard H. Guillen; Patricia S. Guillen, both of 9027 Rendalia, Bellflower, Calif. 90706

[21] Appl. No.: 268,288

[22] Filed: Nov. 7, 1988

[51] Int. Cl.⁴ .............................................. A47F 5/08
[52] U.S. Cl. ..................................... 211/100; 211/96; 211/98
[58] Field of Search ................... 211/99, 100, 171, 96, 211/97, 98, 107, 110, 111; 248/226.4, 230, 225.31; 224/42.07, 42.08, 42.45 A

[56] References Cited

U.S. PATENT DOCUMENTS

| | | | |
|---|---|---|---|
| 2,490,994 | 12/1949 | Brown | 211/96 |
| 2,734,639 | 2/1956 | Green | 211/96 |
| 3,044,674 | 7/1962 | Levy | 224/42.45 A X |
| 3,103,289 | 9/1963 | Clary | 224/42.08 |
| 3,888,354 | 6/1975 | Margolin et al. | 211/110 |

FOREIGN PATENT DOCUMENTS 964306  8/1950  France ................................. 211/96

Primary Examiner—Robert W. Gibson, Jr.
Attorney, Agent, or Firm—Edgar W. Averill, Jr.

[57] ABSTRACT

A retractable clothes hanger capable of withstanding travel when affixed to a motor vehicle. The clothes hanger has a rod support block held by pivot means so that it is moveable between a horizontal position and a vertical position. The support block has a group of hanger bars pivotally held thereto. When the support block is moved from its usable horizontal position to a downward, vertical position, the rods are held by a support clip.

12 Claims, 2 Drawing Sheets

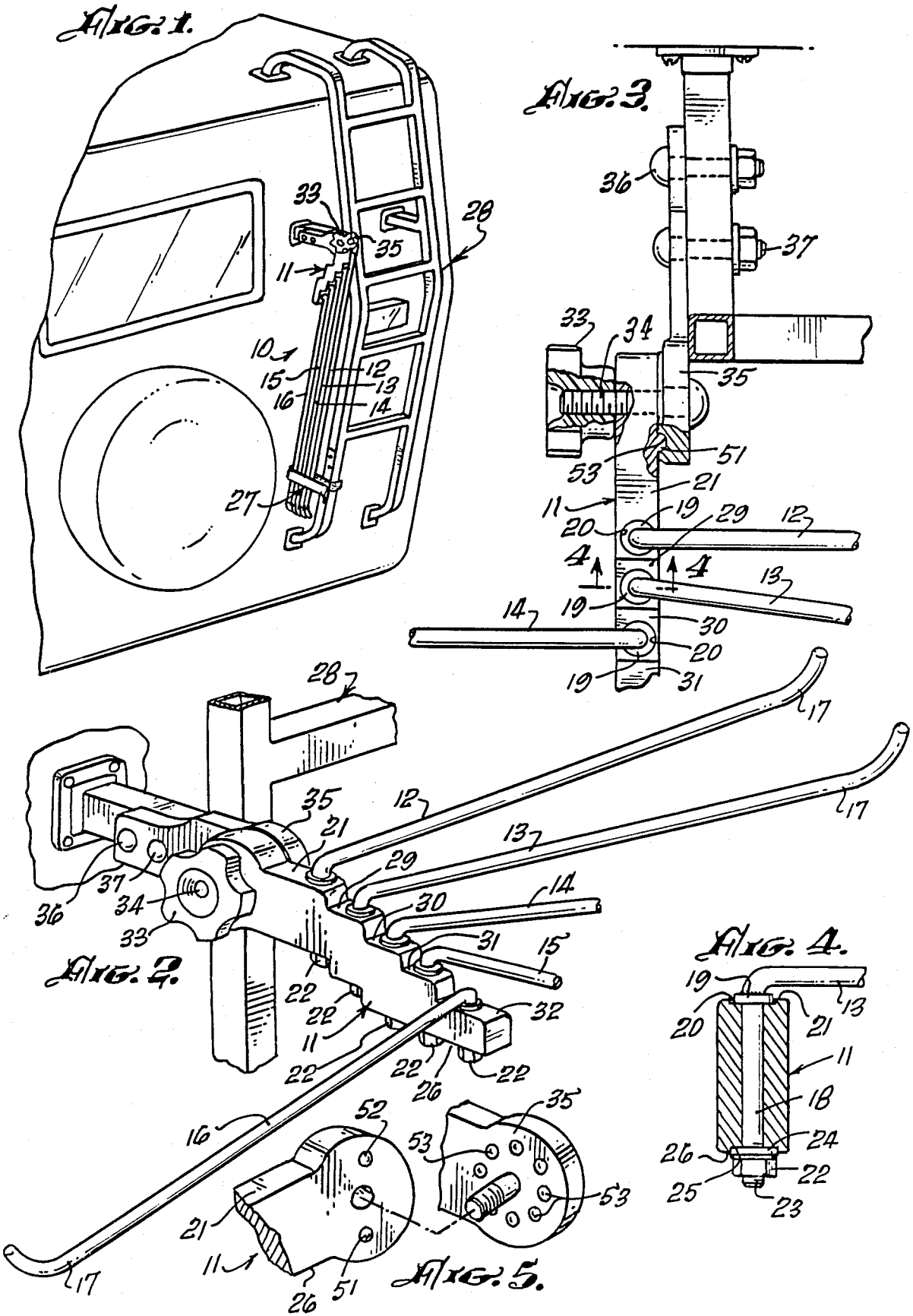

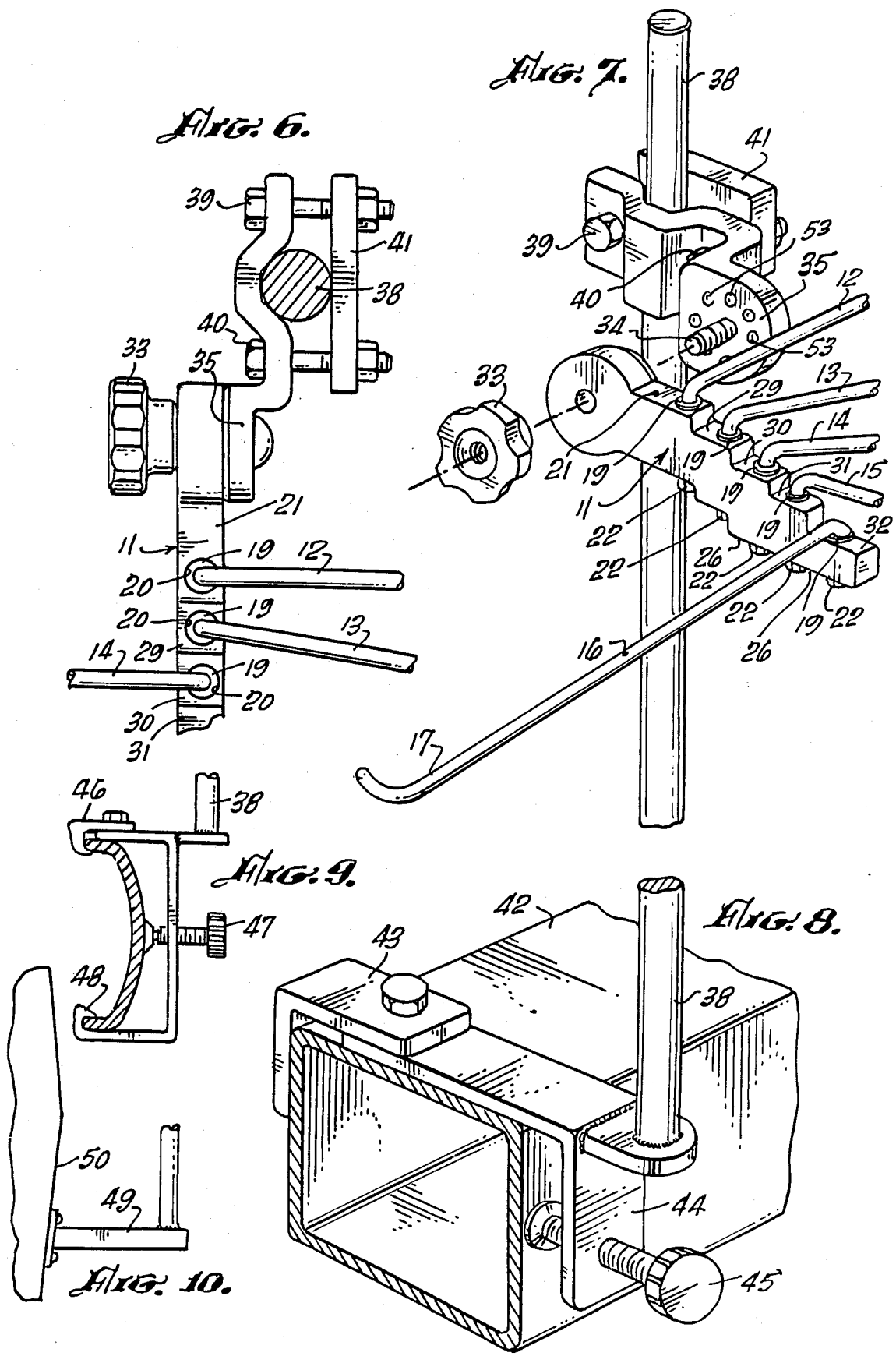

RETRACTABLE CLOTHES HANGER

BACKGROUND OF THE INVENTION

The field of the invention is recreational accessories, and the invention relates more particularly to clothes hangers for drying swimming suits and other objects commonly used in conjunction with vacation travel.

When one is traveling on vacation with a trailer, camper, motor home or the like, it is very common in most recreational areas for swimming to be available. This necessitates the drying of swimming suits and towels, and this is carried out by various haphazard means. Often, clothes are hung over ladders or other portions of the recreational vehicle which is also unsightly and can cause staining of the clothes and corrosion of the part on which they are hung.

SUMMARY OF THE INVENTION

It is an object of the present invention to provide a clothes hanger which may be affixed to a motor vehicle and which is sufficiently streamlined to permit travel without rattling or damage to the clothes line.

The present invention is for a retractable clothes hanger capable of withstanding travel when affixed to a motor vehicle. The clothes hanger has a hanger rod support block held by pivot means so that it is moveable between a horizontal position and a vertical position. The hanger rod support block has a lower surface and an upper surface when in its horizontal position. The upper surface has a plurality of stepped rod washer surfaces and a plurality of vertical holes passing through the hanger rod support block at the stepped rod washer surfaces. A plurality of hanger rods are held by the support block, and each hanger rod has an elongated hanger portion and a support length at right angles thereto. The support length has a washer near the intersection with the hanger portion, and the support portion extends downwardly from the washer portion through the support block where a nut, or other secure holding means, is provided. Preferably, there are five hanger rods so that they may be fanned away from the support block when in use and, preferably, the support block is fabricated from cast aluminum. A rod tip holding clip is preferably affixed to the motor vehicle or other place of use. The clip has a pair of flexible arms which grip the tips of the hanger rods when the rods are moved downwardly to a generally vertical orientation and placed in vertical alignment with one another. A tightenable clamp is preferably used to hold the support block in either its horizontal or vertical position, and a detent is preferably provided to assist in its being retained in the proper orientation. The hanger rods are preferably plastic-coated steel.

BRIEF DESCRIPTION OF THE DRAWINGS

FIG. 1 is a perspective view of the retractable clothes hanger of the present invention affixed to a ladder of a motor home.

FIG. 2 is an enlarged perspective view of the clothes hanger of FIG. 1.

FIG. 3 is an enlarged plan view of the pivot portion of the clothes hanger of FIG. 1.

FIG. 4 is a cross-sectional view taken along line 4—4 of FIG. 3.

FIG. 5 is an exploded, perspective view showing the clamp between the support block and base of the clothes hanger of FIG. 1.

FIG. 6 is a top view, partly in cross-section, of an alternate clamp means of the clothes hanger of FIG. 1.

FIG. 7 is a perspective view of the alternate clamp assembly of FIG. 6.

FIG. 8 is a perspective view of a means of holding a vertical rod to a square channel member.

FIG. 9 is an alternate upper clamp for a vertical rod to support the clothes hanger of FIG. 1.

FIG. 10 is an alternate method of clamping a vertical support post to a generally vertical surface.

DESCRIPTION OF THE PREFERRED EMBODIMENTS

The retractable hanger of the present invention is shown in FIG. 1 and indicated generally by reference character 10. As shown in FIG. 2, the retractable hanger has a stepped block 11 and five hanger rods 12, 13, 14, 15 and 16. Each hanger rod has an elongated hanger length 17 and a vertical support length 18. A washer 19 is welded, or otherwise affixed, at the intersection of each vertical support length 18 and each elongated hanger portion 17. Washer 19 is held in a recess 20 in the upper surface 21 of stepped block 11. A lock nut 22 is threaded onto the lower end 23 of each vertical support length 18, and a washer 24 is held in a recess 25 formed in lower surface 26 of stepped block 11. Lock nuts 22 should be tightened sufficiently so that the hanger rods may still be turned and yet remain in their turned position.

As shown in FIG. 1, the hanger bars can be swung into alignment with stepped block 11, and stepped block 11 may be pivoted downwardly so that the rods fit into a clip 27 held by ladder 28. The streamline folding of the hanger rods is permitted by the plurality of steps indicated by reference characters 29, 30, 31 and 32.

The clamp is easily secured in either a horizontal or a vertical orientation by a knob 33, or a wing nut, or other easily tightened handle. Such handle is threaded onto a bolt 34 held in a base member 35. Base member 35 may be bolted to the ladder by a pair of nuts and bolts 36 and 37, shown in FIG. 3, or, instead, may be clamped on a vertical rod 38, as shown in FIG. 6, by a clamp consisting of nuts and bolts 39 and 40 and a clamp bar 41. This type of clamp permits the easy removal of the clothes hanger from the vehicle and its support on the ground by having rod 38 with a lower point and a step plate for pushing into the earth. Alternatively, as shown in FIG. 8, bar 38 may be clamped onto a square hose channel 42 by an angled bar 43 and a support bar 44. Support bar 44 has a threaded opening through which a clamp screw 45 is placed. Alternatively, a clamp consisting of a bumper hook 46, a clamp screw 47 and a lower bumper hook 48 may be used to support the rod. Alternatively, the rod may be simply welded to a horizontal bar 49 and bolted into a wall surface of any sort, such as wall surface 50.

Returning to FIG. 5, a particular method of holding the stepped block 11 in a desired position is shown where a pair of projections 51 and 52 may fit into any pair of recesses 53 to help support the clamp in its desired orientation.

The hanger bars are preferably fabricated from steel so that they have sufficient strength, and it has been found that steel rods having a diameter of 11/32 have sufficient strength for this purpose. These steel rods should, of course, be coated with a corrosion-resistant coating and a flexible plastisol or other polymeric coating is particularly beneficial since it tends to eliminate any rattling between the rods and clip 27.

It has been found that the retractable clothes hanger of the present invention provides a rattle-free device even at freeway speeds or along country roads. It is easily opened and equally easily retracted.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

What is claimed is:

1. A retractable clothes hanger capable of withstanding travel when affixed to a motor vehicle, said clothes hanger comprising:
    a hanger rod support block held by pivot means so that it is movable between a horizontal position and a vertical position, said hanger rod support block having a lower surface and an upper surface when in its horizontal position which upper surface has a plurality of stepped rod washer surfaces and a plurality of vertical holes passing through said hanger rod support block at said stepped rod washer surfaces;
    a plurality of hanger rods having an elongated hanger portion and a support length at a right angle with respect to said hanger portion, the support length having a washer near the intersection of the hanger portion and the support length, said washer of each hanger abutting said stepped rod washer surfaces of said support block; and
    means for holding said support length of each hanger rod in said support block, said means being tight enough to permit the hanger rods to remain in any set angular position while being free enough to permit the hanger rod to be turned into a desired angular orientation.

2. The retractable clothes hanger of claim 1 wherein there are five of said hanger rods.

3. The retractable clothes hanger of claim 1 wherein said support block is fabricated from cast aluminum.

4. The retractable clothes hanger of claim 1 further including a rod tip holding clip affixed below said support block, said holding clip having two flexible arms which grip the tips of said hanger rods when said rods are moved downwardly to a generally vertical orientation.

5. The retractable clothes hanger of claim 1 wherein said support block is held against a base member by a tightenable clamp and one of said support block or said base member has a plurality of depressions and the other has at least one protrusion to assist in supporting the support block in a desired orientation.

6. The retractable clothes hanger of claim 5 wherein said base member is affixed to a vertical support member.

7. The retractable clothes hanger of claim 6 wherein said vertical support member is clamped to a square channel member.

8. The retractable clothes hanger of claim 6 wherein said vertical support member is clamped to a motor vehicle bumper.

9. A retractable clothes hanger capable of withstanding travel when affixed to a motor vehicle, said clothes hanger comprising:
    a hanger rod support block held by pivot means so that it is movable between a horizontal position and a vertical position, said hanger rod support block having a lower surface and an upper surface when in its horizontal position which upper surface has five stepped rod washer surfaces and five vertical holes passing through said hanger rod support block at said stepped rod washer surfaces;
    five hanger rods having an elongated hanger portion and a support length at a right angle with respect to said hanger portion, the support length having a washer near the intersection of the hanger portion and the support length, said washer of each hanger abutting said stepped rod washer surfaces of said support block; and
    a lock nut for holding said support length of each hanger rod in said support block, said lock nuts being tight enough to permit the hanger rods to remain in any set angular position while being free enough to permit the hanger rod to be turned into a desired angular orientation.

10. The retractable clothes hanger of claim 9 wherein said hanger rods are steel rods which are coated with a corrosion-resistant coating.

11. The retractable clothes hanger of claim 10 wherein said corrosion resistant coating is a resilient polymer and further wherein said clothes hanger includes a clip comprising two flexible clip arms which are spaced apart sufficiently to grip the rods when they are aligned and moved to a downwardly oriented position.

12. The retractable clothes hanger of claim 9 wherein said washer of each hanger is recessed in a circular opening in the upper surface of said support block.

* * * * *